United States Patent
Watanabe et al.

(10) Patent No.: US 9,372,429 B2
(45) Date of Patent: Jun. 21, 2016

(54) CHARGING MEMBER, MANUFACTURING METHOD FOR CHARGING MEMBER, ELECTROPHOTOGRAPHIC APPARATUS, AND PROCESS CARTRIDGE

(71) Applicant: CANON KABUSHIKI KAISHA, Tokyo (JP)

(72) Inventors: Hiroaki Watanabe, Odawara (JP); Shinsuke Kokubo, Goettingen (DE); Toshiro Suzuki, Gotemba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/830,444

(22) Filed: Aug. 19, 2015

(65) Prior Publication Data
US 2015/0355567 A1    Dec. 10, 2015

Related U.S. Application Data

(63) Continuation of application No. PCT/JP2015/001299, filed on Mar. 10, 2015.

(30) Foreign Application Priority Data

Mar. 11, 2014   (JP) ................... 2014-047795

(51) Int. Cl.
*G03G 15/02*   (2006.01)
*B01J 19/08*   (2006.01)

(52) U.S. Cl.
CPC ........... *G03G 15/0233* (2013.01); *B01J 19/085* (2013.01); *G03G 15/02* (2013.01)

(58) Field of Classification Search
CPC .......................... G03G 15/0233; B01J 19/085
USPC ........................................................ 399/111
See application file for complete search history.

(56) References Cited

U.S. PATENT DOCUMENTS

| | | | |
|---|---|---|---|
| 5,732,311 A * | 3/1998 | May ..................... | G03G 5/0205 399/159 |
| 8,712,291 B2 | 4/2014 | Suzuki et al. | |
| 2010/0158583 A1 * | 6/2010 | Sakka .................. | G03G 15/162 399/302 |

(Continued)

FOREIGN PATENT DOCUMENTS

| JP | 9-90714 A | 4/1997 |
|---|---|---|
| JP | 2000-267394 A | 9/2000 |

(Continued)

OTHER PUBLICATIONS

International Search Report dated Apr. 7, 2015 in International Application No. PCT/JP2015/001299.

*Primary Examiner* — Walter L Lindsay, Jr.
*Assistant Examiner* — Philip Marcus T Fadul
(74) *Attorney, Agent, or Firm* — Fitzpatrick, Cella, Harper and Scinto

(57) ABSTRACT

Provided is a charging member capable of suppressing adhesion of smear on its surface and suppressing generation of a C set image as well.

The charging member includes: an electroconductive support; and an elastic layer as a surface layer, in which: the elastic layer has at least one local maximum value in a distribution of Young's modulus at respective positions in a depth direction thereof; and "a", "Tmax" and "b" satisfy the following expressions (1) to (3): (1) 0.8 μm≤Tmax≤2.5 μm, (2) 0.6 MPa≤b≤1.2 MPa, (3) (a−b)/b≥0.40.

13 Claims, 4 Drawing Sheets

(56) References Cited

U.S. PATENT DOCUMENTS

2013/0310239 A1    11/2013   Terada et al.
2014/0321880 A1*   10/2014   Karashima ......... G03G 21/0017
                                                             399/101

FOREIGN PATENT DOCUMENTS

| JP | 2013-200558 A | 10/2013 |
| JP | 2013-218275 A | 10/2013 |

* cited by examiner

CHARGING MEMBER, MANUFACTURING METHOD FOR CHARGING MEMBER, ELECTROPHOTOGRAPHIC APPARATUS, AND PROCESS CARTRIDGE

CROSS-REFERENCE TO RELATED APPLICATIONS

This application is a continuation of International Application No. PCT/JP2015/001299, filed Mar. 10, 2015, which claims the benefit of Japanese Patent Application No. 2014-047795, filed Mar. 11, 2014.

BACKGROUND OF THE INVENTION

1. Field of the Invention

The present invention relates to a charging member to be used in an electrophotographic apparatus. The present invention also relates to a manufacturing method for the charging member. The present invention also relates to an electrophotographic apparatus and process cartridge including the charging member.

2. Description of the Related Art

As means for charging a photosensitive member in an electrophotographic apparatus such as a copying machine or a printer, there is given a contact charging system involving bringing a charging member into contact with the photosensitive member to charge the photosensitive member. As the charging member, there is generally known one having a configuration in which an electroconductive elastic layer is formed on an electroconductive support and a surface layer is formed on the electroconductive elastic layer. A shaft made of a metal is used as the electroconductive support. A vulcanized rubber having mixed therein various additives is used for the electroconductive elastic layer in order that functions as the charging member may be fulfilled. Further, a resin or the like is used for the surface layer in order that functions such as control of an electrical resistance value and prevention of smear may be fulfilled.

The electroconductive elastic layer generally has such electroconductivity as a volume specific resistivity of about from $1 \times 10^3$ to $1 \times 10^7$ Ω·cm. In order to obtain an elastic layer having such electroconductivity, Japanese Patent Application Laid-Open No. H09-090714 discloses that an electronic conduction-type electroconductive rubber composition having blended therein electroconductive particles such as carbon black is used to form the elastic layer.

However, in the charging member including such elastic layer using a rubber or a thermoplastic elastomer, when the elastic layer is brought into abutment with the photosensitive member in a static state over a long time period, deformation that is not easily recovered (compression set) may be generated in the abutment portion. It should be noted that "compression set" is hereinafter sometimes referred to as "C set" in short. When the charging member in which the C set is generated is used for electrophotographic image formation, a defect may occur in an electrophotographic image. Herein, such electrophotographic image having a horizontal streak-like defect caused by the C set in the charging member is hereinafter sometimes referred to as "C set image." In order to suppress generation of the C set image, there has been proposed a method involving forming on a surface of the elastic layer a high-hardness and low-friction surface layer formed of a resin material or the like (see Japanese Patent Application Laid-Open No. 2000-267394).

SUMMARY OF THE INVENTION

However, as disclosed in Japanese Patent Application Laid-Open No. 2000-267394, the charging member including such high-hardness surface layer is liable to smear on its surface. Such charging member in which smear adheres onto its surface may cause a defect in an electrophotographic image.

Accordingly, the present invention is directed to providing a charging member capable of suppressing adhesion of smear on its surface and suppressing generation of a C set image as well. Further, the present invention is directed to provide a charging member in which adhesion of smear is suppressed during long-term use. Further, the present invention is directed to providing an electrophotographic apparatus capable of stably forming an electrophotographic image of high quality.

According to one aspect of the present invention, there is provided a charging member, including: an electroconductive support; and an elastic layer as a surface layer, in which: the elastic layer has at least one local maximum value in a distribution of Young's modulus at respective positions in a depth direction thereof; and, when, of the local maximum values of Young's modulus, a local maximum value of Young's modulus at a position Pmax closest to a surface of the elastic layer in the depth direction is defined as "a" (MPa), a depth of the position Pmax from the surface of the elastic layer is defined as "Tmax" (μm), and a Young's modulus of the elastic layer at a position having a depth of 0.1 (μm) from the surface of the elastic layer is defined as "b" (MPa),
"a", "Tmax" and "b" satisfy the following expressions (1) to (3).

$$0.8 \ \mu m \leq Tmax \leq 2.5 \ \mu m \quad (1)$$

$$0.6 \ MPa \leq b \leq 1.2 \ MPa \quad (2)$$

$$(a-b)/b \geq 0.40 \quad (3)$$

In addition, according to another aspect of the present invention, there is provided a manufacturing method for the charging member, the manufacturing method including a step of irradiating a vulcanized rubber layer on an outer circumference of the electroconductive support with an electron beam in an atmosphere having an oxygen concentration of 500 ppm or more and 13,000 ppm or less, to form the elastic layer.

Further, according to further aspect of the present invention, there is provided an electrophotographic apparatus, including: an electrophotographic photosensitive member; and the charging member arranged in contact with the electrophotographic photosensitive member. Further, according to further aspect of the present invention, there is provided a process cartridge, including: an electrophotographic photosensitive member; and the charging member arranged in contact with the electrophotographic photosensitive member, the process cartridge being detachably mountable onto a main body of an electrophotographic apparatus.

According to the present invention, the charging member capable of suppressing adhesion of smear on its surface and suppressing generation of a C set image as well is provided. In addition, according to the present invention, the electrophotographic apparatus capable of stably forming an electrophotographic image of high quality is provided.

Further features of the present invention will become apparent from the following description of exemplary embodiments with reference to the attached drawings.

DESCRIPTION OF THE EMBODIMENTS

Figure 1:
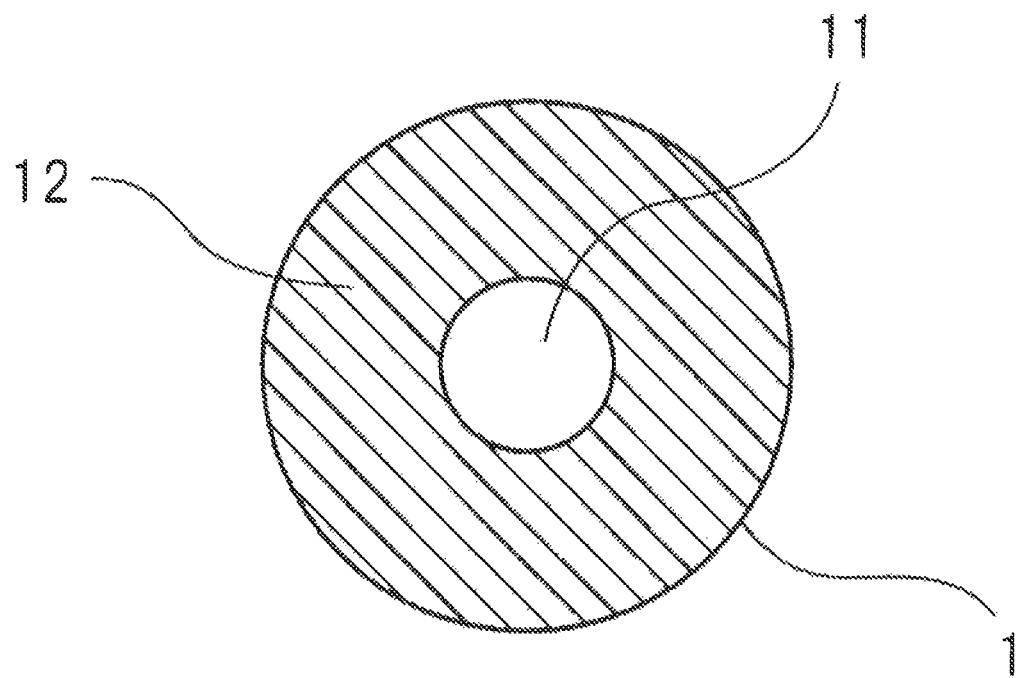
FIG. 1 is a sectional view of a charging roller according to the present invention.

Preferred embodiments of the present invention will now be described in detail in accordance with the accompanying drawings.

The inventors of the present invention have made diligent investigations aiming at obtaining a charging member that is less liable to cause an image failure resulting from compression set and suppresses adhesion of smear on its surface.

As a result, the inventors have found that the above-mentioned objects can be achieved by a charging member, including: an electroconductive support; and an elastic layer as a surface layer, in which: the elastic layer has at least one local maximum value in a distribution of Young's modulus at respective positions in a depth direction thereof; and, when, of the local maximum values of Young's modulus, a local maximum value of Young's modulus at a position Pmax closest to a surface of the elastic layer in the depth direction is defined as "a" (MPa), a depth of the position Pmax from the surface of the elastic layer is defined as "Tmax" (μm), and a Young's modulus of the elastic layer at a position having a depth of 0.1 (μm) from the surface of the elastic layer is defined as "b" (MPa), "a", "Tmax" and "b" satisfy the following expressions (1) to (3).

$$0.8 \ \mu m \leq Tmax \leq 2.5 \ \mu m \quad (1)$$

$$0.6 \ MPa \leq b \leq 1.2 \ MPa \quad (2)$$

$$(a-b)/b \geq 0.40 \quad (3)$$

It should be noted that, in the following description, the position having a depth of 0.1 (μm) from the surface of the elastic layer is sometimes referred to as "outermost surface portion" or "surface vicinity", and the Young's modulus "b" is sometimes referred to as "Young's modulus b in the outermost surface portion" or "Young's modulus b in the surface vicinity". The charging member according to the present invention is hereinafter described by way of a charging roller, which is a typical example of the charging member.

The inventors of the present invention presume that the reason why effects of the present invention can be obtained by satisfying the conditions represented by the mathematical expressions (1) to (3) in a Young's modulus distribution of the elastic layer as a surface layer in a depth direction thereof is as described below.

Pressure from a photosensitive member is applied mainly on the surface of the charging member. Therefore, in order to suppress the compression set of the elastic layer, it is necessary to form a stable cross-linking chain between polymer molecules constituting the elastic layer, and thereby suppress strain after the charging member is left for a long time period. For this, it is effective to increase the hardness of the elastic layer. On the other hand, considering the adhesion of smear onto the elastic layer, it is effective to reduce the hardness of the elastic layer. In consequence, it is difficult for the related art to highly balance suppression of the compression set and reduction in the adhesion of smear.

The inventors of the present invention have observed smear adhering onto the surface layer of the charging member, and found that the main causative substance of the smear is an external additive of toner. The external additive is fine particles each having a particle diameter of about 1 μm or less. When the outermost surface portion of the elastic layer, which is brought into contact with the fine particles, has high hardness, the fine particles are liable to be brought into press-contact therewith to adhere onto the surface of the elastic layer. Therefore, when the condition represented by the mathematical expression (2) is satisfied, the outermost surface portion of the elastic layer, with which the external additive is brought into press-contact, can have low hardness, and the adhesion of the external additive can be reduced.

On the other hand, in order to suppress generation of C set, and by extension, generation of a C set image (hereinafter sometimes referred to as "improvement in C set property"), it is effective to increase the hardness of the surface of the elastic layer as described above. However, the inventors of the present invention have made investigations and found that, even when the surface of the elastic layer has such a relatively low hardness as to satisfy the mathematical expression (2) in order to suppress the adhesion of smear as described above, the C set property can be improved by forming a portion having a high Young's modulus in a region having a depth of 0.8 μm or more and 2.5 μm or less from the surface of the elastic layer.

As a result, an improvement in C set property and a reduction in adhesion of smear can be concurrently achieved, which is the object of the present invention.

In the charging member according to the present invention, Tmax is preferably 0.8 μm or more and 1.8 μm or less. The local maximum value "a" of Young's modulus in an inner portion of the elastic layer is preferably 1.5 MPa or more. The Young's modulus b in the outermost surface portion is preferably 0.7 MPa or more and 1.2 MPa or less.

In addition, in the present invention, a Young's modulus c in the inner portion of the elastic layer at a deep position having a depth exceeding 2.5 μm from the surface of the elastic layer is preferably lower than the Young's modulus b. When the Young's modulus c at a position having a depth of 300 μm from the surface of the charging member is lower than the Young's modulus b at a position having a depth of 0.1 μm from the surface, the followability of the charging member to the photosensitive member is enhanced when the charging member is driven while being brought into contact with the surface of the photosensitive member, and charging uniformity can be further improved. Herein, for example, a specific value of the Young's modulus c is preferably 0.5 MPa or less.

An embodiment of the present invention is hereinafter described with reference to FIG. 1. It should be noted that the present invention is not limited to the embodiment.

<Charging Member>

FIG. 1 is an illustration of a schematic configuration example of the charging roller as the charging member of the present invention. A charging roller 1 includes an electroconductive support 11 and an elastic layer 12 as a surface layer formed on the electroconductive support 11. The charging member according to the present invention may be used as the charging roller 1 for forming an electrophotographic apparatus illustrated in FIG. 3.

(Electroconductive Support)

A material of the electroconductive support may be exemplified by, for example, a metal such as iron, copper, stainless steel, aluminum, or nickel, and an alloy of those metals. In addition, the electroconductive support to be used may have applied thereon an adhesive in view of adhesion with the elastic layer. An example of the adhesive is a thermosetting resin or thermoplastic resin having incorporated therein an electroconductive agent. As the adhesive, an urethane resin-based adhesive, an acrylic resin-based adhesive, a polyester resin-based adhesive, a polyether resin-based adhesive, an epoxy resin-based adhesive, or the like may be used.

<Manufacturing Method for Charging Member>

The elastic layer according to the present invention may be formed, for example, as described below.

First, an unvulcanized rubber roller is formed by laminating an unvulcanized rubber composition on the electroconductive support (mandrel). As a method of forming the rubber roller, there is given, for example: (1) a method involving extruding the unvulcanized rubber composition with an extruder to form the composition into a tube shape, and inserting therein the core metal; (2) a method involving co-extruding the unvulcanized rubber composition into a cylinder shape with the mandrel provided at its center with an extruder equipped with a crosshead, to obtain a molded body having a desired outer diameter; or (3) a method involving injecting the unvulcanized rubber composition into a mold having a desired outer diameter with an injecting molding machine, to obtain a molded body. Of those methods, the method (2) is preferred because the method facilitates continuous manufacturing, includes a small number of steps, and is suitable for manufacturing at low cost.

Next, the formed unvulcanized rubber is vulcanized, to produce a vulcanized rubber roller in which a vulcanized rubber layer is formed around the support. The vulcanization is performed by heat treatment. A heating device may employ hot-air oven heating using a gear oven, heat vulcanization by far infrared rays, steam heating using a vulcanizer, or the like. Of those, hot-air oven heating and heating by far infrared rays are preferred because continuous manufacturing is enabled.

After that, the surface of the vulcanized rubber roller may be further subjected to grinding treatment. As a method of grinding the surface of the vulcanized rubber roller, there is given, for example, a method of a transverse grinding system, involving performing grinding by moving grindstone or the vulcanized rubber roller in a thrust direction thereof. Alternatively, there is given a method of a plunge-cut grinding system, involving rotating the vulcanized rubber roller around the axis of the mandrel, and allowing grindstone having a width larger than the length of the roller to cut into the roller without reciprocating the grindstone. The method of a plunge-cut cylindrical grinding system is more preferred because the method has the following advantages: the vulcanized rubber roller can be ground across its full width at one time; and a processing time period can be shortened as compared to that in the case of the method of a transverse cylindrical grinding system.

Then, the elastic layer having a specific Young's modulus (hardness) distribution in a depth direction thereof, which is a feature of the present invention, may be formed by irradiating the vulcanized rubber layer of the vulcanized rubber roller with an electron beam in an atmosphere having an oxygen concentration of 500 ppm or more and 13,000 ppm or less.

Electron beam irradiation is generally performed in an atmosphere having a low oxygen concentration (in a nitrogen atmosphere) in order to suppress a cleavage reaction of a polymer molecular chain caused by oxidation. However, in the present invention, the electron beam irradiation is performed in an atmosphere having an appropriate oxygen concentration, and thereby the elastic layer according to the present invention having a specific Young's modulus profile (hardness profile) in a depth direction thereof can be formed.

In conventional surface treatment of the vulcanized rubber layer in the charging member using an electron beam, the irradiation is performed in an atmosphere having an oxygen concentration as low as possible and thereby the hardness is increased in the outermost surface portion of the elastic layer in the charging member. However, in the present invention, the Young's modulus of the elastic layer in the charging roller is reduced in the outermost surface portion thereof by allowing a polymer molecular chain to proceed with a cleavage reaction through oxidation, rather than to form a radical cross-linking chain, and thereby reducing the cross-linking density of a polymer. In contrast, the Young's modulus of the elastic layer is increased in the inner portion side thereof, resulting in local maximum hardness, because the inner portion side is less affected by oxygen and hence oxidation is suppressed, and thereby the cross-linking efficiency of the polymer is enhanced. Then, the Young's modulus of the elastic layer gradually lowers because electron beam irradiation energy gradually becomes smaller as the depth from the surface of the elastic layer becomes larger. In consequence, there arises a difference in hardness between the outermost surface portion of the elastic layer and the inner portion thereof. Thus, the C set property of the charging member is improved, and in addition, the adhesion of smear on the surface of the elastic layer caused by particle compression is suppressed by flexibility of the outermost surface portion of the elastic layer, resulting in an improvement in charging uniformity.

While a method of controlling the hardness distribution of the elastic layer in a depth direction thereof by controlling the oxygen concentration of the atmosphere has hereinbefore been described, the hardness distribution may be controlled by use of a difference in energy for allowing the electron beam to penetrate the elastic layer in a depth direction thereof. The conditions of hardening treatment of the elastic layer using an electron beam are determined by an accelerating voltage and dose of the electron beam, and the hardness distribution of the elastic layer in a depth direction thereof may be controlled by the magnitude of the accelerating voltage. In addition, the hardness distribution of the elastic layer in a depth direction thereof may also be controlled by adjusting the amount of the polymer, carbon black, or the like to be blended in the elastic layer.

As described above, the elastic layer in the charging member of the present invention has a specific hardness profile (Young's modulus profile) in which the surface vicinity is soft and the inner portion is hard. Thus, the compression set and the adhesion of smear are concurrently suppressed. It should be noted that a measurement method for the Young's modulus of the elastic layer is described later.

(Elastic Layer)

A raw material for forming the elastic layer (rubber composition for forming the elastic layer) is, for example, a mixture of a binder polymer and an additive. The binder polymer is not particularly limited as long as it is a material exhibiting rubber elasticity. Specific examples of the rubber material include: thermosetting rubber materials obtained by blending a cross-linking agent such as a vulcanizing agent in raw material rubbers such as a natural rubber (NR), an isoprene rubber (IR), a butadiene rubber (BR), a styrene-butadiene rubber (SBR), an isobutylene-isoprene rubber (IIR), an ethylene-propylene-diene terpolymer rubber (EPDM), an epichlorohydrin homopolymer (CHC), an epichlorohydrin-ethylene oxide copolymer (CHR), an epichlorohydrin-ethylene oxide-allyl glycidyl ether terpolymer (CHR-AGE), an acrylonitrile-butadiene rubber (NBR), a hydrogenated acrylonitrile-butadiene copolymer (H-NBR), a chloroprene rubber (CR), and an acrylic rubber (ACM, ANM); and thermoplastic elastomers such as a polyolefin-based thermoplastic elastomer, a polystyrene-based thermoplastic elastomer, a polyester-based thermoplastic elastomer, a polyurethane-based thermoplastic elastomer, a polyamide-based thermoplastic elastomer, and a polyvinyl chloride-based thermoplastic elastomer. Further, a blended mixture of those polymers may be used. Of those, an acrylonitrile-butadiene rubber is preferred from the viewpoints of providing the elastic layer with electroconductivity and improving the cross-linking efficiency in the surface treatment of the elastic layer through irradiation with an electron beam or the like. The content ratio of acrylonitrile in the acrylonitrile-butadiene rubber is not particularly limited, but is preferably 18 mass % or more and 41 mass % or less.

The elastic layer may contain carbon black as electroconductive particles as required. The carbon black may be blended therein after being adjusted so that the elastic layer exhibits a desired electrical resistance value. The content of the carbon black is preferably 20 parts by mass or more and 70 parts by mass or less with respect to 100 parts by mass of the binder polymer. When the content of the carbon black is 20 parts by mass or more, a reduction in the hardness of the elastic layer is suppressed, and moderate hardness can be obtained. In addition, when the content of the carbon black is 70 parts by mass or less, an increase in the hardness of the elastic layer is suppressed, and moderate hardness can be easily obtained. When the hardness of the elastic layer is too large, an abutment failure with the photosensitive member may occur, and smear such as toner or paper powder may heterogeneously adhere onto the surface of the charging member in long-term use, resulting in an image failure.

Examples of the kind of the carbon black blended include, but not particularly limited to, gas furnace black, oil furnace black, thermal black, lump black, acetylene black, and ketjen black.

Further, a filler, a processing aid, a cross-linking aid, a cross-linking accelerator, a cross-linking accelerator activator, a cross-linking retarder, a softening agent, a plasticizer, a dispersant, or the like, which is generally used as a compounding agent for a rubber, may be added to the rubber composition for forming the elastic layer, as required. As a method of mixing those raw materials, there may be given, for example, a mixing method involving using a closed-type mixer such as a Banbury mixer or a pressure kneader, or a mixing method involving using an open-type mixer such as an open roll.

The thickness of the elastic layer according to the present invention is not particularly limited, but is preferably from about 1.0 mm to 1.8 mm.

<Electron Beam Irradiation Apparatus>

Figure 2:
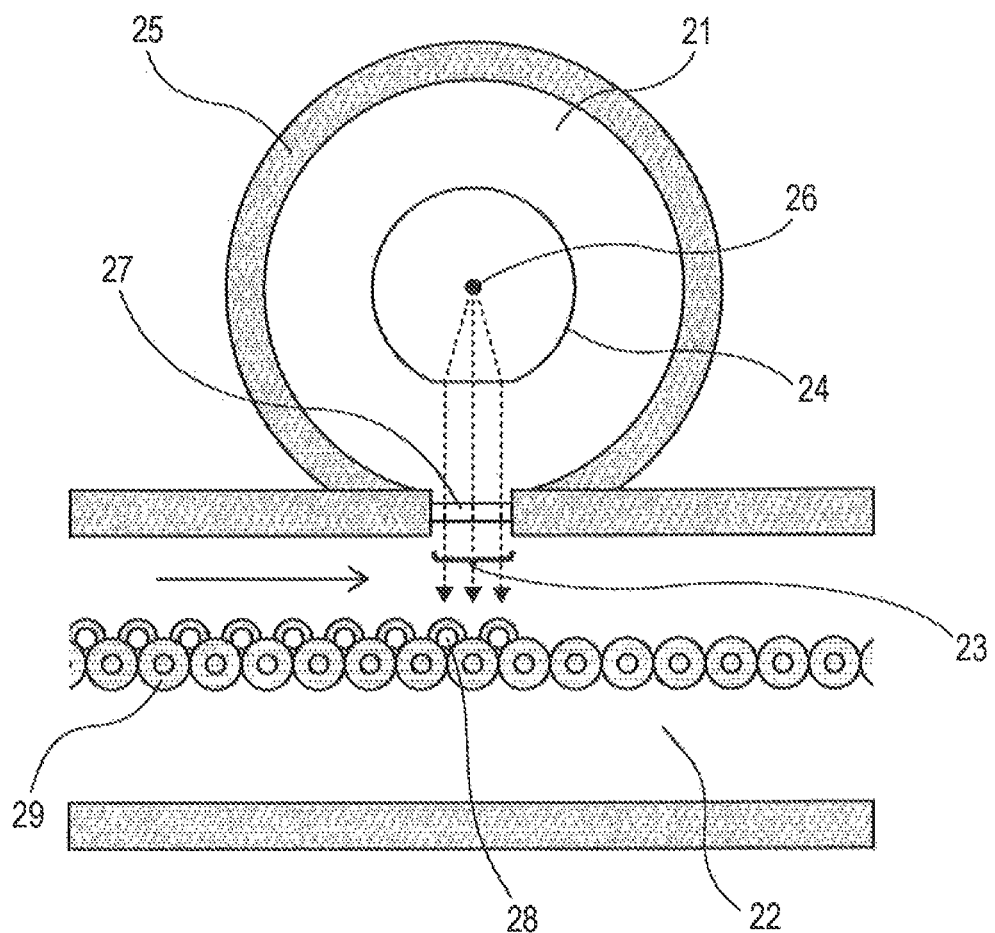
FIG. 2 is an explanatory diagram of an electron beam irradiation apparatus.

FIG. 2 is an illustration of a schematic diagram of an electron beam irradiation apparatus to be used for forming the elastic layer according to the present invention. The electron beam irradiation apparatus is an apparatus configured to irradiate the surface of the rubber roller with an electron beam while allowing the rubber roller to rotate. As illustrated in FIG. 2, the apparatus includes an electron beam generating portion 21, an irradiation chamber 22, and an irradiation hole 23.

The electron beam generating portion 21 includes a terminal 24 of for generating an electron beam and an accelerating tube 25 for accelerating an electron beam generated from the terminal 24 in a vacuum space (accelerating space). Further, the inside of the electron beam generating portion is kept at a vacuum of $10^{-3}$ to $10^{-6}$ Pa with a vacuum pump (not shown) or the like in order to prevent an electron from colliding with a gas molecule to lose energy.

When a filament 26 is heated by being applied with a current by a power source (not shown), the filament 26 releases thermoelectrons, and only the thermoelectrons that have passed through the terminal 24 are extracted effectively as an electron beam. Then, the electron beam is accelerated in the accelerating space in the accelerating tube 25 with its accelerating voltage. After that, the electron beam passes through an irradiation hole foil 27 to irradiate a rubber roller 28 conveyed in the irradiation chamber 22 on the lower side of the irradiation hole 23.

In addition, the rubber roller 28 is allowed to rotate with a member 29 for roller rotation and moves from the left side to the right side in FIG. 2 by conveying means in the irradiation chamber. It should be noted that the electron beam generating portion 21 and the irradiation chamber 22 are surrounded by lead shielding (not shown) in order to prevent an X-ray to be generated secondarily upon electron beam irradiation from leaking to the outside.

The irradiation hole foil 27 is formed of a metal foil and separates a vacuum atmosphere in the electron beam generating portion 21 from an air atmosphere in the irradiation chamber 22. In addition, an electron beam is extracted into the irradiation chamber 22 via the irradiation hole foil 27. Accordingly, the irradiation hole foil 27 to be provided at the boundary between the electron beam generating portion 21 and the irradiation chamber 22 desirably has no pinhole, has a mechanical strength enough to maintain a vacuum atmosphere in the electron beam generating portion 21, and allows an electron beam to pass therethrough easily. Therefore, the irradiation hole foil 27 is desirably a metal foil having a small specific gravity and a small thickness, and an aluminum foil or a titanium foil is generally used.

Conditions for curing treatment with an electron beam depend on the accelerating voltage and dose of the electron beam. The accelerating voltage affects a curing treatment depth. A condition for the accelerating voltage in the present invention is preferably a range of 40 kV or more and 300 kV or less as a low energy region. At 40 kV or more, a sufficient treatment thickness for obtaining the effects of the present invention can be achieved. In addition, the control of the accelerating voltage to 300 kV or less can suppress an increase in size of an electron beam irradiation apparatus and an increase in apparatus cost. The condition for the accelerating voltage is more preferably a range of 70 kV or more and 150 kV or less.

The dose of the electron beam in the electron beam irradiation is defined by the following mathematical expression (4).

$$D=(K\cdot I)/V \quad (4)$$

In the mathematical expression, D represents a dose (kGy), K represents an apparatus constant, I represents an electron current (mA), and V represents a treatment speed (m/min). The apparatus constant K is a constant representing the efficiency of an individual apparatus, and is an indicator of the performance of the apparatus. The apparatus constant K may be determined by measuring the dose while changing the electron current and the treatment speed under a constant-accelerating voltage condition. The dose of the electron beam is measured as described below. A film for dosimetry is attached to the surface of the rubber roller, the surface of the rubber roller is actually irradiated with the electron beam, and the film for dosimetry is subjected to measurement of the dose with a film dosimeter. The film for dosimetry and film dosimeter to be used may be FWT-60 and FWT-92D (each of which is manufactured by Far West Technology, Inc.), respectively.

The dose of the electron beam in the present invention preferably falls within a range of 30 kGy or more and 3,000 kGy or less. The control of the dose to 30 kGy or more can easily provide a surface hardness enough to provide the effect of the present invention. In addition, the control of the dose to 3,000 kGy or less can suppress an increase in manufacturing cost due to upsizing of an electron beam irradiation apparatus or an increase in treatment time. The dose of the electron beam more preferably falls within a range of 200 kGy or more and 2,000 kGy or less.

In the present invention, the oxygen concentration in the irradiation chamber 22 is 500 ppm or more and 13,000 ppm or less in electron beam irradiation treatment. When the oxygen concentration is less than 500 ppm, the surface of the roller is less susceptible to oxidation owing to an atmosphere having a low oxygen concentration, which prevents the outermost surface portion from having a soft configuration, and smear resistance lowers. When the oxygen concentration exceeds 13,000 ppm, the surface of the roller is highly susceptible to oxidation, which reduces the Young's modulus in the surface inner portion and the local maximum value therein as well, and the C set property lowers.

In the present invention, a scanning-type electron beam irradiation source (not shown) or an area-type electron beam irradiation source (not shown) may be used as an electron beam irradiation source.

<Electrophotographic Apparatus and Process Cartridge>

An electrophotographic apparatus according to the present invention includes an electrophotographic photosensitive member and a charging member arranged in contact with the electrophotographic photosensitive member. As the charging member, the charging member according to the present invention is used. In addition, a process cartridge according to the present invention includes an electrophotographic photosensitive member and a charging member arranged in contact with the electrophotographic photosensitive member. The process cartridge is detachably mountable to the main body of an electrophotographic apparatus. As the charging member, the charging member according to the present invention is used.

Figure 3:
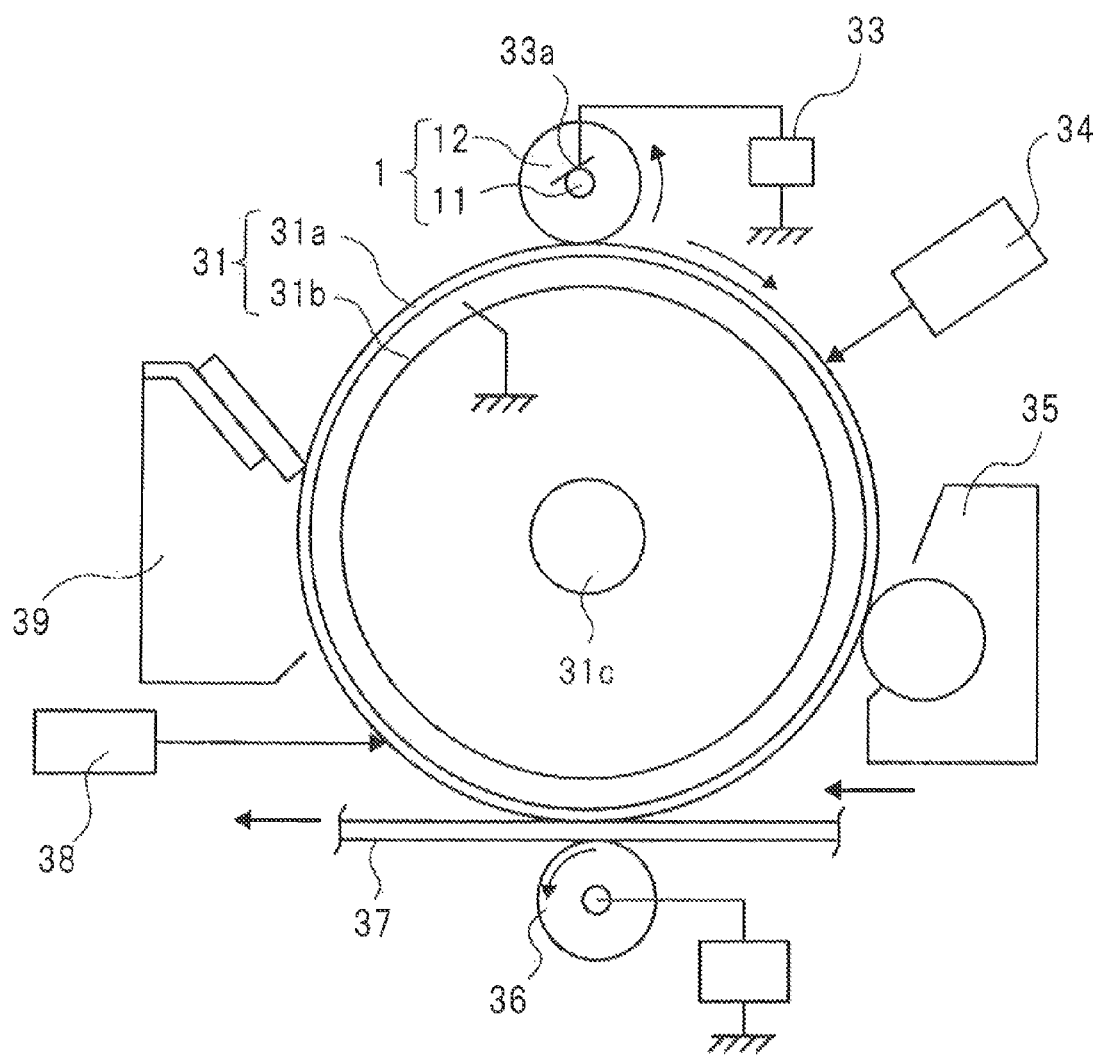
FIG. 3 is a schematic configuration diagram of an electrophotographic apparatus according to the present invention.

FIG. 3 is an illustration of a sectional view of the electrophotographic apparatus including the charging member according to the present invention. An electrophotographic photosensitive member 31 is a drum-shaped electrophotographic photosensitive member including as its basic constituent layers an electroconductive support 31b having electroconductivity made of aluminum or the like and a photosensitive layer 31a formed on the electroconductive support 31b. The electrophotographic photosensitive member 31 is driven to rotate about a shaft 31c in a clockwise direction of FIG. 3 at a predetermined circumferential speed. The charging roller 1 according to the present invention is pressed against the electrophotographic photosensitive member 31 by press device (not shown) provided at both ends of the electroconductive support 11. When the electrophotographic photosensitive member 31 is rotated by a drive device (not shown), the charging roller 1 is driven to rotate with the rotation of the electrophotographic photosensitive member 31. When a predetermined direct current (DC) bias is applied to the electroconductive support 11 by a sliding power source 33a connected to a power source 33, the electrophotographic photosensitive member 31 is charged to have a predetermined polarity and a predetermined potential.

The electrophotographic photosensitive member 31 having a circumferential surface charged with the charging roller 1 is then subjected to exposure corresponding to intended image information (laser beam scanning exposure, slit exposure of a manuscript image, or the like) by an exposure device 34, and thereby an electrostatic latent image corresponding to the intended image information is formed on the circumferential surface. The electrostatic latent image is sequentially visualized as a toner image by a developing member 35. The toner image is then sequentially transferred by a transferring device 36 onto a transfer material 37, which is conveyed from a paper feeding device portion (not shown) to a transfer portion located between the electrophotographic photosensitive member 31 and the transferring device 36, at an appropriate timing in synchronization with the rotation of the electrophotographic photosensitive member 31. The transferring device 36 is a transfer roller in this example, and the toner image on the electrophotographic photosensitive member 31 side is transferred onto the transfer material 37 by charging the transfer material 37 with a polarity opposite to that of toner from the back surface of the transfer material 37. The transfer material 37, in which the toner image is transferred onto its surface, is separated from the electrophotographic photosensitive member 31, conveyed to a fixing device (not shown) for image fixation, and finally output as an image-formed material. Alternatively, in the case of forming an image also on the back surface of the transfer material, the transfer material is conveyed to a re-conveyor device for the transfer portion.

After the image is transferred, the circumferential surface of the electrophotographic photosensitive member 31 is subjected to pre-exposure by a pre-exposure device 38, and thereby a charge remaining on an electrophotographic photosensitive drum is removed (charge removal). A known device may be used as the pre-exposure device 38, and preferred examples thereof may include an LED chip array, a fuse lamp, a halogen lamp, and a fluorescent lamp. The circumferential surface of the electrophotographic photosensitive member 31 after the charge removal is subjected to removal of adhesive contaminants such as transfer residual toner by a cleaning member 39, to be a clean surface, and is repeatedly used for image formation.

The charging roller 1 may be driven with the electrophotographic photosensitive member 31, which is driven with surface movement, may be prevented from rotating, or may be positively driven to rotate at a predetermined circumferential speed in a direction along the surface movement direction of the electrophotographic photosensitive member 31 or in a direction opposite thereto. In addition, in the case where the electrophotographic apparatus is used as a copying machine, the exposure is performed, for example, by using reflection light from or transmission light through a manuscript, by reading the manuscript to convert it into a signal, and scanning a laser beam based on the signal, or by driving an LED array.

As the electrophotographic apparatus that can use the charging member according to the present invention, there is given, for example, a copying machine, a laser beam printer, an LED printer, or an electrophotography-applied apparatus such as one employing an electrophotographic plate making system.

EXAMPLES

Now, the present invention is more specifically described by way of Examples and Comparative Examples.

Example 1

(1. Preparation of Unvulcanized Rubber Composition for Elastic Layer)

Materials shown in Table 1 below were mixed in a 6-liter pressure kneader (trade name: TD6-15MDX, manufactured by Toshin Co., Ltd.) at a filling rate of 70 vol % and a blade rotation number of 30 rpm for 16 minutes. Thus, an A-kneaded rubber composition was obtained.

TABLE 1

| Material | Part(s) by mass |
| --- | --- |
| Acrylonitrile-butadiene rubber (trade name: DN401LL, manufactured by Zeon Corporation, content ratio of acrylonitrile: 18 mass %) | 100 |
| Zinc stearate | 1 |
| Zinc oxide | 5 |
| Calcium carbonate (trade name: Nanox #30, manufactured by Maruo Calcium Co., Ltd.) | 15 |
| Carbon black 1 (trade name: Raven 1000, manufactured by Columbian Chemicals Company) | 25 |
| Carbon black 2 MT carbon (trade name: Thermax Floform N990, manufactured by Cancarb) | 20 |

Next, materials shown in Table 2 below were bilaterally cut a total of twenty times with an open roll having a roll diameter of 12 inches (0.30 m) at a front-roll rotation number of 10 rpm and a rear-roll rotation number of 8 rpm with a roll interval of 2 mm. After that, the mixture was subjected to tight milling ten times at a roll interval of 0.5 mm. Thus, an unvulcanized rubber composition for an elastic layer was obtained.

TABLE 2

| Material | Part(s) by mass |
| --- | --- |
| A-kneaded rubber composition | 166 |
| Sulfur | 1.2 |
| Tetrabenzylthiuram disulfide (trade name: Nocceler TBzTD, manufactured by Ouchi Shinko Chemical Industrial Co., Ltd.) | 1.2 |
| N-t-butyl-2-benzothiazolesulfenimide (trade name: SANTOCURE-TBSI, manufactured by FLEXSYS) | 1.2 |

(2. Formation of Vulcanized Rubber Layer)

An electroconductive support to be used was obtained by applying an electroconductive vulcanization adhesive (Metaloc U-20, manufactured by Toyo Kagaku Kenkyusho Co., Ltd.) onto the columnar surface of a columnar bar made of steel (having a nickel-plated surface) in its central portion in its axial direction having a length of 228 mm, the bar having a diameter of 6 mm and a length of 252 mm, followed by drying the adhesive at 80° C. for 30 minutes. Next, the unvulcanized rubber composition was coaxially extruded into a cylindrical shape together with the electroconductive support provided at the center thereof by extrusion using a crosshead. Thus, an unvulcanized rubber roller in which the outer circumference of the electroconductive support was coated with the unvulcanized rubber composition was produced. An extruder used here had a cylinder diameter of 45 mm ($\phi$45) and L/D=20. During extrusion, the temperatures of the crosshead, the cylinder, and a screw were each set to 90° C.

The both ends of the unvulcanized rubber composition layer in the formed unvulcanized rubber roller in its axis direction were cut so that the length of the unvulcanized rubber composition layer was 226 mm in the axis direction. After that, the unvulcanized rubber roller was heated in an electric furnace at a temperature of 160° C. for 40 minutes, and thereby the unvulcanized rubber composition layer was vulcanized to form a vulcanized rubber layer. Next, the surface of the vulcanized rubber layer was ground with a grinding machine of a plunge-cut grinding system. Thus, a vulcanized rubber roller including a crown-shaped rubber layer having a diameter of 8.35 mm at its end portions (at positions each having a distance of 90 mm from its central portion toward an end direction) and having a diameter of 8.50 mm at its central portion was obtained.

(3. Surface Hardening Treatment of Vulcanized Rubber Layer)

The surface of the obtained vulcanized rubber roller was subjected to hardening treatment through irradiation with an electron beam. Thus, a "charging roller 1" having a hardened region in the surface of the elastic layer was obtained. The electron beam irradiation was performed by using an electron beam irradiation apparatus (trade name: "Low energy electron beam irradiation source EB-ENGINE," manufactured by Hamamatsu Photonics K.K.) having a maximum accelerating voltage of 70 kV and a maximum electron current of 4.5 mA. It should be noted that air in an irradiation chamber was purged with a nitrogen gas to adjust the oxygen concentration in the irradiation chamber prior to the electron beam irradiation. The treatment conditions were as follows: an accelerating voltage of 70 kV; an electron current (irradiation current) of 3.2 mA; a treatment speed (scanning speed) of 0.6 m/min; and an oxygen concentration of 800 ppm. At this time, a device constant of the electron beam irradiation apparatus was 218 at an accelerating voltage of 70 kV, and a dose was calculated to be 1,163 kGy based on the mathematical expression (4).

(4. Evaluation)

Various evaluations were performed by the following methods.

(4-1. Measurement of Hardness of Vulcanized Rubber Layer)

The vulcanized rubber layer after the electron beam irradiation was measured for its MD-1 hardness. The measurement was performed by using a micro hardness meter (trade name: MD-1 capa, manufactured by Kobunshi Keiki Co., Ltd.) in an environment having a temperature of 23° C. and a relative humidity of 55% in a peak hold mode. More specifically, the vulcanized rubber roller was placed on a metal plate, and simply fixed by placing metal blocks so that the vulcanized rubber roller was prevented from rolling. A measurement terminal of type A was precisely pressed on the center of the vulcanized rubber roller in a direction perpendicular to the metal plate, and a value was read 5 seconds after the pressing. The measurement was performed on 3 positions in a circumferential direction at each of the central portion of the vulcanized rubber roller and both end portions thereof each having a distance of from 30 to 40 mm from the rubber end portion of the vulcanized rubber roller in its axis direction. Thus, the measurement was performed on a total of 9 positions. An average value of the obtained measurement values was defined as the MD-1 hardness of the vulcanized rubber layer. As a result, the MD-1 hardness of the vulcanized rubber layer was found to be 70.8°.

(4-2. Measurement of Young's Modulus of Elastic Layer)

The elastic layer in the charging roller 1 was evaluated for its modulus of elasticity (Young's modulus) at each position in its thickness direction from the surface of the elastic layer toward an inner portion thereof by the following method.

The elastic layer was cut out from the charging roller 1 by using a diamond knife in a state in which the charging roller 1 was retained at −110° C. with a cryomicrotome (FC6, manufactured by Leica), to obtain a rubber sample having smooth cross sections in its thickness direction. The obtained rubber sample was measured for its Young's modulus at each point having a predetermined depth from the surface of the elastic layer with an atomic force microscope (AFM, E-sweep, manufactured by SII Nano Technology, Inc.) using a cantilever (trade name "SI-DF20", manufactured by SII Nano Technology, Inc., material: SiN, probe length: 12.5 µm, apex radius: 10 nm). It should be noted that a measurement pitch was set to 0.1 µm. At each of the measurement points (measurement positions), a force curve was measured 10 times and the Young's modulus was determined as an arithmetic average of 8 points excluding the maximum value and the minimum value.

Figure 4:
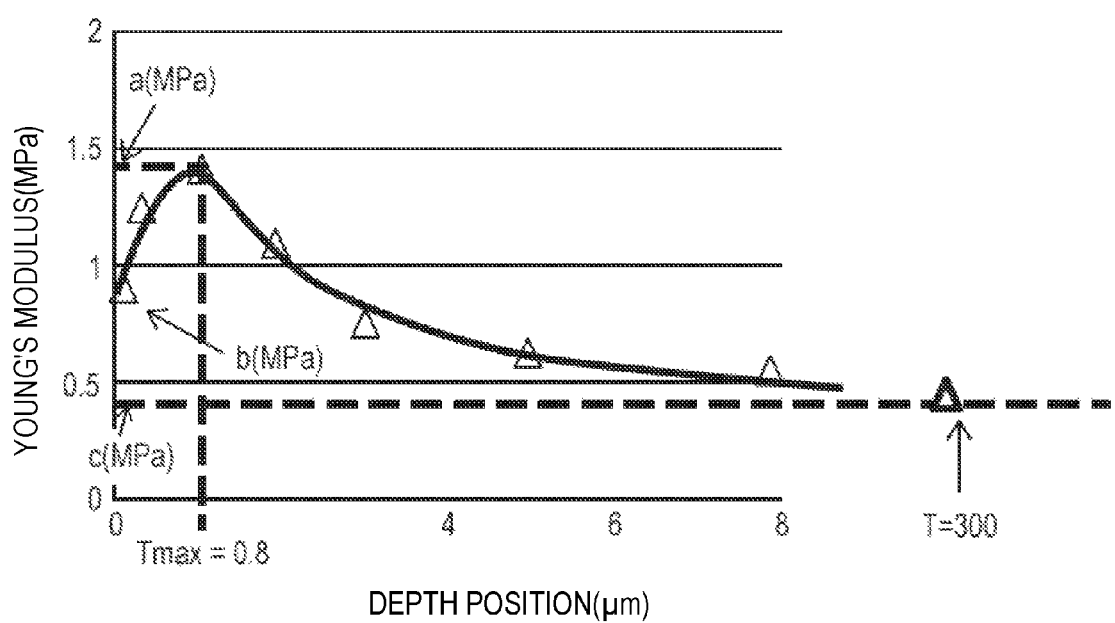
FIG. 4 is a graph for showing a measurement example of a Young's modulus with an atomic force microscope.

FIG. 4 is an example of measurement results of the Young's modulus of the elastic layer in a depth direction thereof. The horizontal axis of the graph represents a measurement depth (μm), that is, a distance from the surface of the elastic layer to the measurement position. The vertical axis of the graph represents a Young's modulus (MPa). As a result, the local maximum value "a" of Young's modulus was 1.3 MPa, the depth Tmax was 0.8 μm, the Young's modulus b was 0.7 MPa, and the Young's modulus c at a position having a depth of 300 μm was 0.4 MPa.

(4-3. Evaluation of C Set Image)

The charging roller 1 was installed in a process cartridge by applying a load of 500 g to both ends of the charging roller 1 to coaxially bring the roller into press-contact with a photosensitive member of 00 mm. The process cartridge was left in an environment having a temperature of 40° C. and a relative humidity of 95% for 30 days (hereinafter referred to as "severe environment test"). Next, the process cartridge was incorporated into an electrophotographic apparatus (LBP7200C, manufactured by Canon Inc.), and a C set image, which was caused by compression set of the charging roller, was evaluated. The evaluation result was ranked based on the following criteria A to E. The charging roller 1 was evaluated as rank B.

A: No C set image is observed.
B: A C set image is very extremely slightly observed.
C: A C set image is extremely slightly observed.
D: A C set image is slightly observed.
E: A C set image is clearly observed.

(4-4. Measurement of Strain Amount)

The charging roller after being subjected to the severe environment test in the section 4-3 was measured for its deformation amount in a portion brought into press-contact with the photosensitive member. A general laser dimension meter (LS-5500, manufactured by Keyence Corporation) was used for the measurement, and "a strain amount" was defied as "a difference between the outer diameter $d_2$ of the press-contact portion and the outer diameter $d_1$ of the press-contact portion before the press-contact." The outer diameter of the press-contact portion was measured at positions each having a distance of 90 mm from the central portion of the charging roller toward an end direction, and their average value was adopted as the outer diameter of the press-contact portion. As a result, the strain amount was found to be 4.8 μm.

(4-5. Evaluation of Image before and after Endurance)

The charging roller 1 was incorporated into an electrophotographic process cartridge, and the process cartridge was incorporated into an electrophotographic apparatus (LBP7200C, manufactured by Canon Inc.) configured to output A4 paper in a portrait orientation. Image evaluation was performed by using the apparatus.

Specifically, a half tone image (an image in which one-dot-width lines were drawn in a direction perpendicular to the rotation direction of the electrophotographic photosensitive member at two-dot intervals) was output on A4-size paper as a first image. This is referred to as "initial image". Next, an image in which a character "E" having a character size of 4 points was formed at a printing density of 1% (hereinafter also referred to as "E character image") was continuously output on A4-size paper on 2,500 sheets. Subsequently, the half tone image was again output on A4-size paper. This is referred to as "image after endurance." It should be noted that the images were output in an environment having a temperature of 23° C. and a relative humidity of 50%.

The obtained initial image and image after endurance were visually observed, and evaluated based on the following criteria. In addition, regarding the image after endurance, in the case where an image failure was observed therein, the following operation was performed in order to investigate the cause of the image failure: after the output of the image after endurance, the process cartridge was taken out from the electrophotographic apparatus, the charging roller was in turn taken out from the process cartridge, and the presence or absence of smear was observed on the surface of the charging roller. A correspondence relationship between an image failure portion in the image after endurance in which the image failure was observed and a smear adhesion portion in the charging roller was observed, and whether or not the image failure was derived from the smear on the surface of the charging roller was analyzed.

A: No image failure occurs.
B: The image failure extremely slightly occurs.
C: The image failure slightly occurs.
D: The image failure clearly occurs.

As a result, the rank of the initial image was A, and the rank of the image after endurance was A.

Examples 2 to 30

A charging roller was produced in the same manner as in Example 1 except that at least one of the polymer (acrylonitrile-butadiene rubber), oxygen concentration, scanning speed, and irradiation current was changed to the condition shown in Tables 3-1 to 5-2, and subjected to the evaluations. The evaluation results are shown in Tables 3-1 to 5-2. It should be noted that N230SV (manufactured by JSR Corporation) and N220S (manufactured by JSR Corporation) used as an acrylonitrile-butadiene rubber have content ratios of acrylonitrile of 35 mass % and 41 mass %, respectively.

Example 31

A charging roller was produced in the same manner as in Example 1 except that the blended amount of carbon black 1 was changed to 30 parts by mass, and subjected to the evaluations. The evaluation results are shown in Table 5-2.

It should be noted that the charging roller according to Example 31 was subjected to surface observation and smear resulting from adhesion of an external additive or the like was not observed therein as in the charging rollers according to other Examples. However, the Young's modulus c at a position having a depth of 300 μm from the surface layer was larger than the Young's modulus b at the surface vicinity. Therefore, abutment with the electrophotographic photosensitive member was unstable as compared to those in other Examples, and hence the rank of the evaluation result of the image after endurance was "B".

Comparative Examples 1 to 3 and 7

Charging rollers were produced in the same manner as in Example 2 except that the oxygen concentration was changed to values shown in Tables 6-1 and 6-2, and subjected to the evaluations. The evaluation results are shown in Tables 6-1 and 6-2.

Comparative Examples 4 and 8

Charging rollers were produced in the same manner as in Example 1 except that only the oxygen concentration or the oxygen concentration and irradiation current were changed to values shown in Tables 6-1 and 6-2, and subjected to the evaluations. The evaluation results are shown in Tables 6-1 and 6-2.

Comparative Example 5

A charging roller was produced in the same manner as in Example 3 except that the oxygen concentration, the irradiation current, and the scanning speed were changed to 26,000 ppm, 3.8 mA, and 0.4 m/min, respectively, and subjected to the evaluations. The evaluation results are shown in Table 6-2.

Comparative Example 6

A charging roller was produced in the same manner as in Example 9 except that the oxygen concentration was changed to 18,000 ppm, and subjected to the evaluations. The evaluation results are shown in Table 6-2.

TABLE 3-1

|  | Example 1 | Example 2 | Example 3 | Example 4 | Example 5 |
|---|---|---|---|---|---|
| Elastic layer |  |  |  |  |  |
| NBR (N230SV) | — | 100 | — | — | 100 |
| NBR (DN401LL) | 100 | — | — | 100 | — |
| NBR (N220S) | — | — | 100 | — | — |
| Carbon black 1 | 25 | 25 | 25 | 25 | 25 |
| Carbon black 2 | 20 | 20 | 20 | 20 | 20 |
| Zinc oxide | 5 | 5 | 5 | 5 | 5 |
| Zinc stearate | 1 | 1 | 1 | 1 | 1 |
| Calcium carbonate | 15 | 15 | 15 | 15 | 15 |
| Sulfur | 1.2 | 1.2 | 1.2 | 1.2 | 1.2 |
| Nocceler TBzTD | 1.2 | 1.2 | 1.2 | 1.2 | 1.2 |
| TBSI | 1.2 | 1.2 | 1.2 | 1.2 | 1.2 |
| Electron beam irradiation | Present | Present | Present | Present | Present |
| Accelerating voltage (kV) | 70 | 70 | 70 | 70 | 70 |
| Irradiation current (mA) | 3.2 | 3.2 | 3.2 | 3.2 | 3.2 |
| Scanning speed (m/min) | 0.6 | 0.6 | 0.6 | 0.6 | 0.45 |
| Dose (kGy) | 1,163 | 1,163 | 1,163 | 1,163 | 1,550 |
| Oxygen concentration (ppm) | 800 | 800 | 500 | 550 | 550 |
| MD-1 hardness | 70.8 | 71.8 | 72.6 | 71.3 | 71.9 |
| Young's modulus |  |  |  |  |  |
| Young's modulus b in surface vicinity (MPa) | 0.7 | 0.7 | 0.8 | 0.7 | 0.8 |
| Depth Tmax (μm) | 0.8 | 0.8 | 0.8 | 0.8 | 0.8 |
| Local maximum value "a" of Young's modulus in inner portion (MPa) | 1.3 | 1.7 | 1.8 | 1.0 | 1.5 |
| Change rate (a − b)/b | 0.86 | 1.43 | 1.25 | 0.43 | 0.88 |
| Young's modulus c at depth of 300 μm (MPa) | 0.4 | 0.4 | 0.5 | 0.4 | 0.4 |
| C set image evaluation |  |  |  |  |  |
| Image rank | B | A | A | B | A |
| Strain amount (μm) | 4.8 | 4.2 | 4.0 | 4.9 | 4.2 |
| Image evaluation before and after endurance |  |  |  |  |  |
| Initial image | A | A | A | A | A |
| Image after endurance | A | A | A | A | A |

TABLE 3-2

|  | Example 6 | Example 7 | Example 8 | Example 9 | Example 10 |
|---|---|---|---|---|---|
| Elastic layer |  |  |  |  |  |
| NBR (N230SV) | — | 100 | 100 | 100 | 100 |
| NBR (DN401LL) | — | — | — | — | — |
| NBR (N220S) | 100 | — | — | — | — |
| Carbon black 1 | 25 | 25 | 25 | 25 | 25 |
| Carbon black 2 | 20 | 20 | 20 | 20 | 20 |
| Zinc oxide | 5 | 5 | 5 | 5 | 5 |
| Zinc stearate | 1 | 1 | 1 | 1 | 1 |
| Calcium carbonate | 15 | 15 | 15 | 15 | 15 |
| Sulfur | 1.2 | 1.2 | 1.2 | 1.2 | 1.2 |
| Nocceler TBzTD | 1.2 | 1.2 | 1.2 | 1.2 | 1.2 |
| TBSI | 1.2 | 1.2 | 1.2 | 1.2 | 1.2 |

TABLE 3-2-continued

|  | Example 6 | Example 7 | Example 8 | Example 9 | Example 10 |
|---|---|---|---|---|---|
| Electron beam irradiation | Present | Present | Present | Present | Present |
| Accelerating voltage (kV) | 70 | 70 | 70 | 70 | 70 |
| Irradiation current (mA) | 3.6 | 3.2 | 3.2 | 3.8 | 3.8 |
| Scanning speed (m/min) | 0.45 | 0.6 | 0.6 | 0.6 | 0.5 |
| Dose (kGy) | 1,744 | 1,163 | 1,163 | 1,381 | 1,657 |
| Oxygen concentration (ppm) | 550 | 1,500 | 2,100 | 1,400 | 900 |
| MD-1 hardness | 72.6 | 71.3 | 71.6 | 72.3 | 71.9 |
| Young's modulus |  |  |  |  |  |
| Young's modulus b in surface vicinity (MPa) | 0.9 | 0.7 | 0.7 | 1.2 | 1.2 |
| Depth Tmax (μm) | 0.8 | 0.8 | 0.9 | 0.8 | 0.8 |
| Local maximum value "a" of Young's modulus in inner portion (MPa) | 2.8 | 1.4 | 1.8 | 1.7 | 1.7 |
| Change rate (a − b)/b | 2.11 | 1.00 | 1.57 | 0.42 | 0.42 |
| Young's modulus c at depth of 300 μm (MPa) | 0.5 | 0.3 | 0.3 | 0.3 | 0.3 |
| C set image evaluation |  |  |  |  |  |
| Image rank | A | A | A | A | A |
| Strain amount (μm) | 4.0 | 4.3 | 4.1 | 3.9 | 4.1 |
| Image evaluation before and after endurance |  |  |  |  |  |
| Initial image | A | A | A | A | A |
| Image after endurance | A | A | A | A | A |

TABLE 4-1

|  | Example 11 | Example 12 | Example 13 | Example 14 | Example 15 |
|---|---|---|---|---|---|
| Elastic layer |  |  |  |  |  |
| NBR (N230SV) | 100 | — | — | — | 100 |
| NBR (DN401LL) | — | 100 | 100 | 100 | — |
| NBR (N220S) | — | — | — | — | — |
| Carbon black 1 | 25 | 25 | 25 | 25 | 25 |
| Carbon black 2 | 20 | 20 | 20 | 20 | 20 |
| Zinc oxide | 5 | 5 | 5 | 5 | 5 |
| Zinc stearate | 1 | 1 | 1 | 1 | 1 |
| Calcium carbonate | 15 | 20 | 20 | 20 | 20 |
| Sulfur | 1.2 | 1.2 | 1.2 | 1.2 | 1.2 |
| Nocceler TBzTD | 1.2 | 1.2 | 1.2 | 1.2 | 1.2 |
| TBSI | 1.2 | 1.2 | 1.2 | 1.2 | 1.2 |
| Electron beam irradiation | Present | Present | Present | Present | Present |
| Accelerating voltage (kV) | 70 | 70 | 70 | 70 | 70 |
| Irradiation current (mA) | 3.8 | 3.2 | 3.4 | 3.8 | 3.2 |
| Scanning speed (m/min) | 0.4 | 0.6 | 0.6 | 0.6 | 0.6 |
| Dose (kGy) | 2,071 | 1,163 | 1,235 | 1,381 | 1,163 |
| Oxygen concentration (ppm) | 550 | 3,400 | 5,100 | 6,600 | 5,400 |
| MD-1 hardness | 71.1 | 70.4 | 70.7 | 70.8 | 71.6 |
| Young's modulus |  |  |  |  |  |
| Young's modulus b in surface vicinity (MPa) | 1.0 | 0.6 | 0.6 | 0.7 | 0.9 |
| Depth Tmax (μm) | 0.8 | 1.8 | 1.8 | 1.8 | 1.8 |
| Local maximum value "a" of Young's modulus in inner portion (MPa) | 1.6 | 1.1 | 2.1 | 2.4 | 1.5 |
| Change rate (a − b)/b | 0.60 | 0.83 | 2.50 | 2.43 | 0.67 |
| Young's modulus c at depth of 300 μm (MPa) | 0.4 | 0.3 | 0.3 | 0.4 | 0.4 |
| C set image evaluation |  |  |  |  |  |
| Image rank | A | B | A | A | A |
| Strain amount (μm) | 4.2 | 4.6 | 4.4 | 4.3 | 4.5 |

TABLE 4-1-continued

|  | Example 11 | Example 12 | Example 13 | Example 14 | Example 15 |
|---|---|---|---|---|---|
| Image evaluation before and after endurance |  |  |  |  |  |
| Initial image | A | A | A | A | A |
| Image after endurance | A | A | A | A | A |

TABLE 4-2

|  | Example 16 | Example 17 | Example 18 | Example 19 | Example 20 |
|---|---|---|---|---|---|
| Elastic layer |  |  |  |  |  |
| NBR (N230SV) | 100 | 100 | — | — | — |
| NBR (DN401LL) | — | — | — | — | — |
| NBR (N220S) | — | — | 100 | 100 | 100 |
| Carbon black 1 | 25 | 25 | 25 | 25 | 25 |
| Carbon black 2 | 20 | 20 | 20 | 20 | 20 |
| Zinc oxide | 5 | 5 | 5 | 5 | 5 |
| Zinc stearate | 1 | 1 | 1 | 1 | 1 |
| Calcium carbonate | 20 | 20 | 20 | 20 | 20 |
| Sulfur | 1.2 | 1.2 | 1.2 | 1.2 | 1.2 |
| Nocceler TBzTD | 1.2 | 1.2 | 1.2 | 1.2 | 1.2 |
| TBSI | 1.2 | 1.2 | 1.2 | 1.2 | 1.2 |
| Electron beam irradiation | Present | Present | Present | Present | Present |
| Accelerating voltage (kV) | 70 | 70 | 70 | 70 | 70 |
| Irradiation current (mA) | 3.2 | 3.2 | 3.6 | 3.8 | 4.0 |
| Scanning speed (m/min) | 0.5 | 0.4 | 0.6 | 0.6 | 0.6 |
| Dose (kGy) | 1,395 | 1,744 | 1,308 | 1,381 | 1,453 |
| Oxygen concentration (ppm) | 4,600 | 4,900 | 6,800 | 5,400 | 7,700 |
| MD-1 hardness | 71.6 | 71.2 | 72.3 | 72.2 | 72.5 |
| Young's modulus |  |  |  |  |  |
| Young's modulus b in surface vicinity (MPa) | 0.9 | 1.0 | 1.2 | 1.2 | 1.2 |
| Depth Tmax (μm) | 1.8 | 1.8 | 1.8 | 1.8 | 1.8 |
| Local maximum value "a" of Young's modulus in inner portion (MPa) | 1.9 | 2.0 | 1.7 | 2.1 | 2.9 |
| Change rate (a − b)/b | 1.11 | 1.00 | 0.42 | 0.75 | 1.42 |
| Young's modulus c at depth of 300 μm (MPa) | 0.3 | 0.4 | 0.4 | 0.4 | 0.4 |
| C set image evaluation |  |  |  |  |  |
| Image rank | A | A | A | A | A |
| Strain amount (μm) | 4.4 | 4.3 | 4.1 | 4.0 | 3.9 |
| Image evaluation before and after endurance |  |  |  |  |  |
| Initial image | A | A | A | A | A |
| Image after endurance | A | A | A | A | A |

TABLE 5-1

|  | Example 21 | Example 22 | Example 23 | Example 24 | Example 25 |
|---|---|---|---|---|---|
| Elastic layer |  |  |  |  |  |
| NBR (N230SV) | — | — | — | — | — |
| NBR (DN401LL) | 100 | 100 | 100 | 100 | — |
| NBR (N220S) | — | — | — | — | 100 |
| Carbon black 1 | 25 | 25 | 25 | 25 | 25 |
| Carbon black 2 | 20 | 20 | 20 | 20 | 20 |
| Zinc oxide | 5 | 5 | 5 | 5 | 5 |
| Zinc stearate | 1 | 1 | 1 | 1 | 1 |
| Calcium carbonate | 15 | 15 | 15 | 15 | 15 |

TABLE 5-1-continued

|  | Example 21 | Example 22 | Example 23 | Example 24 | Example 25 |
|---|---|---|---|---|---|
| Sulfur | 1.2 | 1.2 | 1.2 | 1.2 | 1.2 |
| Nocceler TBzTD | 1.2 | 1.2 | 1.2 | 1.2 | 1.2 |
| TBSI | 1.2 | 1.2 | 1.2 | 1.2 | 1.2 |
| Electron beam irradiation | Present | Present | Present | Present | Present |
| Accelerating voltage (kV) | 70 | 70 | 70 | 70 | 70 |
| Irradiation current (mA) | 3.8 | 3.8 | 4.0 | 3.8 | 3.2 |
| Scanning speed (m/min) | 0.6 | 0.6 | 0.6 | 0.4 | 0.6 |
| Dose (kGy) | 1,381 | 1,381 | 1,453 | 2,071 | 1,163 |
| Oxygen concentration (ppm) | 9,900 | 13,000 | 8,700 | 6,500 | 7,400 |
| MD-1 hardness | 72.6 | 72.4 | 72.6 | 72.2 | 71.6 |
| Young's modulus |  |  |  |  |  |
| Young's modulus b in surface vicinity (MPa) | 0.6 | 0.6 | 0.6 | 0.7 | 0.9 |
| Depth Tmax (μm) | 2.5 | 2.5 | 2.5 | 2.5 | 2.5 |
| Local maximum value "a" of Young's modulus in inner portion (MPa) | 0.9 | 1.9 | 2.0 | 2.4 | 1.6 |
| Change rate (a − b)/b | 0.50 | 2.17 | 2.33 | 2.43 | 0.78 |
| Young's modulus c at depth of 300 μm (MPa) | 0.4 | 0.4 | 0.4 | 0.4 | 0.4 |
| C set image evaluation |  |  |  |  |  |
| Image rank | B | A | A | A | A |
| Strain amount (μm) | 4.6 | 4.3 | 4.2 | 4.0 | 4.5 |
| Image evaluation before and after endurance |  |  |  |  |  |
| Initial image | A | A | A | A | A |
| Image after endurance | A | A | A | A | A |

TABLE 5-2

|  | Example 26 | Example 27 | Example 28 | Example 29 | Example 30 | Example 31 |
|---|---|---|---|---|---|---|
| Elastic layer |  |  |  |  |  |  |
| NBR (N230SV) | — | 100 | — | — | — | — |
| NBR (DN401LL) | — | — | — | — | — | 100 |
| NBR (N220S) | 100 | — | 100 | 100 | 100 | — |
| Carbon black 1 | 25 | 25 | 25 | 25 | 25 | 30 |
| Carbon black 2 | 20 | 20 | 20 | 20 | 20 | 20 |
| Zinc oxide | 5 | 5 | 5 | 5 | 5 | 5 |
| Zinc stearate | 1 | 1 | 1 | 1 | 1 | 1 |
| Calcium carbonate | 15 | 15 | 15 | 15 | 15 | 15 |
| Sulfur | 1.2 | 1.2 | 1.2 | 1.2 | 1.2 | 1.2 |
| Nocceler TBzTD | 1.2 | 1.2 | 1.2 | 1.2 | 1.2 | 1.2 |
| TBSI | 1.2 | 1.2 | 1.2 | 1.2 | 1.2 | 1.2 |
| Electron beam irradiation | Present | Present | Present | Present | Present | Present |
| Accelerating voltage (kV) | 70 | 70 | 70 | 70 | 70 | 70 |
| Irradiation current (mA) | 3.2 | 3.2 | 3.5 | 3.8 | 4.0 | 3.2 |
| Scanning speed (m/min) | 0.6 | 0.6 | 0.6 | 0.6 | 0.6 | 0.6 |
| Dose (kGy) | 1,163 | 1,163 | 1,272 | 1,381 | 1,453 | 1,163 |
| Oxygen concentration (ppm) | 8,800 | 9,400 | 12,200 | 10,800 | 8,400 | 800 |
| MD-1 hardness | 71.4 | 71.9 | 72.6 | 72.5 | 72.2 | 73.6 |
| Young's modulus |  |  |  |  |  |  |
| Young's modulus b in surface vicinity (MPa) | 0.8 | 0.9 | 1.2 | 1.2 | 1.2 | 0.6 |
| Depth Tmax (μm) | 2.5 | 2.5 | 2.5 | 2.5 | 2.5 | 0.9 |
| Local maximum value "a" of Young's modulus in inner portion (MPa) | 1.4 | 1.5 | 1.8 | 2.7 | 3.4 | 1.1 |
| Change rate (a − b)/b | 0.75 | 0.67 | 0.50 | 1.25 | 1.83 | 0.83 |
| Young's modulus c at depth of 300 μm (MPa) | 0.4 | 0.4 | 0.5 | 0.4 | 0.4 | 0.7 |

TABLE 5-2-continued

|  | Example 26 | Example 27 | Example 28 | Example 29 | Example 30 | Example 31 |
|---|---|---|---|---|---|---|
| C set image evaluation | | | | | | |
| Image rank | B | A | A | A | A | B |
| Strain amount (µm) | 4.7 | 4.5 | 4.0 | 3.8 | 3.6 | 4.7 |
| Image evaluation before and after endurance | | | | | | |
| Initial image | A | A | A | A | A | A |
| Image after endurance | A | A | A | A | A | B |

TABLE 6-1

|  | Comparative Example 1 | Comparative Example 2 | Comparative Example 3 | Comparative Example 4 |
|---|---|---|---|---|
| Elastic layer | | | | |
| NBR (N230SV) | 100 | 100 | 100 | — |
| NBR (DN401LL) | — | — | — | 100 |
| NBR (N220S) | — | — | — | — |
| Carbon black 1 | 25 | 25 | 25 | 25 |
| Carbon black 2 | 20 | 20 | 20 | 20 |
| Zinc oxide | 5 | 5 | 5 | 5 |
| Zinc stearate | 1 | 1 | 1 | 1 |
| Calcium carbonate | 15 | 15 | 15 | 15 |
| Sulfur | 1.2 | 1.2 | 1.2 | 1.2 |
| Nocceler TBzTD | 1.2 | 1.2 | 1.2 | 1.2 |
| TBSI | 1.2 | 1.2 | 1.2 | 1.2 |
| Electron beam irradiation | Present | Present | Present | Present |
| Accelerating voltage (kV) | 70 | 70 | 70 | 70 |
| Irradiation current (mA) | 3.2 | 3.2 | 3.2 | 3.2 |
| Scanning speed (m/min) | 0.6 | 0.6 | 0.6 | 0.6 |
| Dose (kGy) | 1,163 | 1,163 | 1,163 | 1,163 |
| Oxygen concentration (ppm) | 300 | 28,000 | 32,000 | 17,000 |
| MD-1 hardness | 71.9 | 71.6 | 71.3 | 71.5 |
| Young's modulus | | | | |
| Young's modulus b in surface vicinity (MPa) | 0.70 | 0.70 | 0.60 | 0.50 |
| Depth Tmax (µm) | 0.10 | 2.60 | 3.00 | 1.80 |
| Local maximum value "a" of Young's modulus in inner portion (MPa) | 0.70 | 1.30 | 1.20 | 0.90 |
| Change rate (a − b)/b | 0.00 | 0.86 | 1.00 | 0.80 |
| Young's modulus c at depth of 300 µm (MPa) | 0.4 | 0.4 | 0.4 | 0.4 |
| C set image evaluation | | | | |
| Image rank | B | C | C | C |
| Strain amount (µm) | 4.6 | 4.9 | 5.1 | 4.7 |
| Image evaluation before and after endurance | | | | |
| Initial image | A | A | A | A |
| Image after endurance | D | D | C | A |

TABLE 6-2

|  | Comparative Example 5 | Comparative Example 6 | Comparative Example 7 | Comparative Example 8 |
|---|---|---|---|---|
| Elastic layer | | | | |
| NBR (N230SV) | — | 100 | 100 | — |
| NBR (DN401LL) | — | — | — | 100 |
| NBR (N220S) | 100 | — | — | — |
| Carbon black 1 | 25 | 25 | 25 | 25 |

TABLE 6-2-continued

|  | Comparative Example 5 | Comparative Example 6 | Comparative Example 7 | Comparative Example 8 |
|---|---|---|---|---|
| Carbon black 2 | 20 | 20 | 20 | 20 |
| Zinc oxide | 5 | 5 | 5 | 5 |
| Zinc stearate | 1 | 1 | 1 | 1 |
| Calcium carbonate | 15 | 15 | 15 | 15 |
| Sulfur | 1.2 | 1.2 | 1.2 | 1.2 |
| Nocceler TBzTD | 1.2 | 1.2 | 1.2 | 1.2 |
| TBSI | 1.2 | 1.2 | 1.2 | 1.2 |
| Electron beam irradiation | Present | Present | Present | Present |
| Accelerating voltage (kV) | 70 | 70 | 70 | 70 |
| Irradiation current (mA) | 3.8 | 3.8 | 3.2 | 3.6 |
| Scanning speed (m/min) | 0.4 | 0.6 | 0.6 | 0.6 |
| Dose (kGy) | 2,071 | 1,381 | 1,163 | 1,308 |
| Oxygen concentration (ppm) | 26,000 | 18,000 | 16,000 | 24,000 |
| MD-1 hardness | 72.1 | 71.9 | 71.2 | 71.8 |
| Young's modulus |  |  |  |  |
| Young's modulus b in surface vicinity (MPa) | 1.30 | 0.70 | 0.90 | 0.60 |
| Depth Tmax (μm) | 2.50 | 1.90 | 1.40 | 2.50 |
| Local maximum value "a" of Young's modulus in inner portion (MPa) | 1.90 | 0.90 | 1.20 | 0.80 |
| Change rate (a − b)/b | 0.46 | 0.29 | 0.33 | 0.33 |
| Young's modulus c at depth of 300 μm (MPa) | 0.4 | 0.4 | 0.4 | 0.4 |
| C set image evaluation |  |  |  |  |
| Image rank | A | C | B | C |
| Strain amount (μm) | 4.3 | 4.6 | 4.5 | 4.8 |
| Image evaluation before and after endurance |  |  |  |  |
| Initial image | A | A | A | A |
| Image after endurance | D | B | C | D |

As is apparent from Tables 6-1 and 6-2, in Comparative Example 1, the Young's modulus b in the outermost surface portion (surface vicinity) is equal to the local maximum value "a", and hence the adhesion of smear is promoted on the surface of the roller, resulting in a lower rank of the image after endurance. In each of Comparative Examples 2 and 3, the position of Tmax is located at a more inner portion, and hence the deformation amount of the roller is large, resulting in a lower rank of the C set image. In Comparative Example 4, the Young's modulus b in the surface vicinity is low and the image after endurance is satisfactory, but the rank of the C set image is lower. In Comparative Example 5, the Young's modulus b in the surface vicinity is high, and the rank of the image after endurance is lower. In each of Comparative Examples 6 to 8, the change rate between the Young's modulus b in the surface vicinity and the local maximum value "a" in the inner portion is small, and any one of the ranks of the C set image and the image after endurance is lower.

As compared to those results, in each of Examples 1 to 31, the evaluation ranks of the C set image and the image after endurance are A or B, and a satisfactory image having no practical problem is obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-047795, filed Mar. 11, 2014, which is hereby incorporated by reference herein in its entirety.

What is claimed is:

1. A charging member, comprising:
an electroconductive support; and
an elastic layer as a surface layer,
wherein: the elastic layer has at least one local maximum value in a distribution of Young's modulus at respective positions in a depth direction thereof; and,
when,
of the local maximum value(s) of Young's modulus, a local maximum value of Young's modulus at a position Pmax closest to a surface of the elastic layer in the depth direction is defined as "a" (MPa),
a depth of the position Pmax from the surface of the elastic layer is defined as "Tmax" (μm), and
a Young's modulus of the elastic layer at a position having a depth of 0.1 (μm) from the surface of the elastic layer is defined as "b" (MPa),
"a", "Tmax" and "b" satisfy the following expressions (1) to (3):

$$0.8 \ \mu m \leq T\max \leq 2.5 \ \mu m \tag{1}$$

$$0.6 \ \text{MPa} \leq b \leq 1.2 \ \text{MPa} \tag{2}$$

$$(a-b)/b \geq 0.40 \tag{3}$$

2. A charging member according to claim 1, wherein the Young's modulus "b" (MPa) is higher than a Young's modulus "c" (MPa) of the elastic layer at a position having a depth of 300 μm from the surface of the elastic layer.

3. A charging member according to claim 1, wherein a constituent material of the elastic layer comprises an acrylonitrile-butadiene rubber as a binder polymer.

4. A charging member according to claim 1, wherein the elastic layer contains 20 to 70 parts by mass of carbon black with respect to 100 parts by mass of a binder polymer.

5. A charging member according to claim 1, wherein the depth "Tmax" is 0.8 µm or more and 1.8 µm or less.

6. A charging member according to claim 1, wherein the local maximum value "a" of Young's modulus is 1.5 MPa or more.

7. A charging member according to claim 1, wherein the Young's modulus "b" is 0.7 MPa or more and 1.2 MPa or less.

8. A charging member according to claim 1, wherein the charging member has a roller shape.

9. A manufacturing method for the charging member, wherein:
the charging member comprises:
  an electroconductive support; and
  an elastic layer as a surface layer,
  wherein: the elastic layer has at least one local maximum value in a distribution of Young's modulus at respective positions in a depth direction thereof; and, when:
  of the local maximum value(s) of Young's modulus,
  a local maximum value of Young's modulus at a position Pmax closest to a surface of the elastic layer in the depth direction is defined as "a" (MPa),
  a depth of the position Pmax from the surface of the elastic layer is defined as "Tmax" (µm), and
  a Young's modulus of the elastic layer at a position having a depth of 0.1 (µm) from the surface of the elastic layer is defined as "b" (MPa),
  "a", "Tmax" and "b" satisfy the following expressions (1) to (3):

$0.8\ \mu m \leq Tmax \leq 2.5\ \mu m$ (1)

$0.6\ MPa \leq b \leq 1.2\ MPa$ (2)

$(a-b)/b \geq 0.40$ (3)

wherein the manufacturing method comprising a step of irradiating a vulcanized rubber layer on an outer circumference of the electroconductive support with an electron beam in an atmosphere having an oxygen concentration of 500 ppm or more and 13,000 ppm or less, to form the elastic layer.

10. A manufacturing method for the charging member according to claim 9, wherein an accelerating voltage of the electron beam is 40 kV or more and 300 kV or less.

11. A manufacturing method for the charging member according to claim 9, wherein a dose of the electron beam is 30 kGy or more and 3,000 kGy or less.

12. An electrophotographic apparatus, comprising:
an electrophotographic photosensitive member; and
a charging member arranged in contact with the electrophotographic photosensitive member,
wherein:
the charging member comprises:
  an electroconductive support; and
  an elastic layer as a surface layer,
  wherein: the elastic layer has at least one local maximum value in a distribution of Young's modulus at respective positions in a depth direction thereof; and, when:
  of the local maximum value(s) of Young's modulus,
  a local maximum value of Young's modulus at a position Pmax closest to a surface of the elastic layer in the depth direction is defined as "a" (MPa),
  a depth of the position Pmax from the surface of the elastic layer is defined as "Tmax" (µm), and
  a Young's modulus of the elastic layer at a position having a depth of 0.1 (µm) from the surface of the elastic layer is defined as "b" (MPa),
  "a", "Tmax" and "b" satisfy the following expressions (1) to (3):

$0.8\ \mu m \leq Tmax \leq 2.5\ \mu m$ (1)

$0.6\ MPa \leq b \leq 1.2\ MPa$ (2)

$(a-b)/b \geq 0.40$ (3).

13. A process cartridge, comprising:
an electrophotographic photosensitive member; and
a charging member arranged in contact with the electrophotographic photosensitive member,
the process cartridge being detachably mountable to a main body of an electrophotographic apparatus,
wherein:
the charging member comprises:
  an electroconductive support; and
  an elastic layer as a surface layer,
  wherein: the elastic layer has at least one local maximum value in a distribution of Young's modulus at respective positions in a depth direction thereof; and, when:
  of the local maximum value(s) of Young's modulus,
  a local maximum value of Young's modulus at a position Pmax closest to a surface of the elastic layer in the depth direction is defined as "a" (MPa),
  a depth of the position Pmax from the surface of the elastic layer is defined as "Tmax" (µm), and
  a Young's modulus of the elastic layer at a position having a depth of 0.1 (µm) from the surface of the elastic layer is defined as "b" (MPa),
  "a", "Tmax" and "b" satisfy the following expressions (1) to (3):

$0.8\ \mu m \leq Tmax \leq 2.5\ \mu m$ (1)

$0.6\ MPa \leq b \times 1.2\ MPa$ (2)

$(a-b)/b \geq 0.40$ (3).

* * * * *